United States Patent
Nakahara et al.

(10) Patent No.: US 11,564,772 B2
(45) Date of Patent: Jan. 31, 2023

(54) ROLLING BEARING, BEARING UNIT FOR AIR TURBINE, AND AIR TURBINE HANDPIECE FOR DENTAL USE

(71) Applicant: NSK LTD., Tokyo (JP)

(72) Inventors: Toru Nakahara, Fujisawa (JP); Atsuhiro Yamamoto, Fujisawa (JP); Shoshi Miyazaki, Fujisawa (JP)

(73) Assignee: NSK LTD., Tokyo (JP)

(*) Notice: Subject to any disclaimer, the term of this patent is extended or adjusted under 35 U.S.C. 154(b) by 1192 days.

(21) Appl. No.: 16/080,490

(22) PCT Filed: Mar. 7, 2017

(86) PCT No.: PCT/JP2017/009102
§ 371 (c)(1),
(2) Date: Aug. 28, 2018

(87) PCT Pub. No.: WO2017/154935
PCT Pub. Date: Sep. 14, 2017

(65) Prior Publication Data
US 2021/0186654 A1     Jun. 24, 2021

(30) Foreign Application Priority Data

Mar. 7, 2016 (JP) .............................. JP2016-043309
Jun. 29, 2016 (JP) .............................. JP2016-129149

(51) Int. Cl.
*A61C 1/18* (2006.01)
*F16C 19/06* (2006.01)
(Continued)

(52) U.S. Cl.
CPC .............. *A61C 1/181* (2013.01); *F16C 19/06* (2013.01); *A61C 1/05* (2013.01); *F05D 2240/54* (2013.01);
(Continued)

(58) Field of Classification Search
CPC . A61C 1/181; A61C 1/05; F16C 19/06; F16C 33/7823; F16C 2316/13; F05D 2240/54; F05D 2240/55; F16J 15/3204
(Continued)

(56) References Cited

U.S. PATENT DOCUMENTS 3,032,346 A    5/1962 Sullivan
3,473,856 A *  10/1969 Helms ................... F16C 33/783
                                                          384/485
(Continued)

FOREIGN PATENT DOCUMENTS

CN    201396371 Y    2/2010
DE    1 575 506 A1   1/1970
(Continued)

OTHER PUBLICATIONS

Search Report dated May 16, 2017, issued by the International Searching Authority in counterpart International Patent Application No. PCT/JP2017/009102 (PCT/ISA/210).
(Continued)

*Primary Examiner* — Yi-Kai Wang
(74) *Attorney, Agent, or Firm* — Sughrue Mion, PLLC

(57) ABSTRACT

When the compressed air is not applied, an inclined surface, which is positioned at an upstream side with respect to the supply direction of the compressed air, of the lip part is in contact with the inclined surface of the inner ring. When the compressed air is applied, a contact area between the inclined surface, which is positioned at the upstream side with respect to the supply direction of the compressed air, of the lip part and the inclined surface of the inner ring becomes smaller, as compared to when the compressed air is not applied.

8 Claims, 24 Drawing Sheets

(51) Int. Cl.
*A61C 1/05* (2006.01)
*F16C 33/78* (2006.01)
*F16J 15/3204* (2016.01)

(52) U.S. Cl.
CPC ...... *F05D 2240/55* (2013.01); *F16C 33/7823* (2013.01); *F16C 2316/13* (2013.01); *F16J 15/3204* (2013.01)

(58) Field of Classification Search
USPC ....................................................... 433/132
See application file for complete search history.

(56) References Cited

U.S. PATENT DOCUMENTS

| | | | | |
|---|---|---|---|---|
| 4,533,265 | A | * | 8/1985 | Woodbridge ....... F16C 33/7856 277/369 |
| 5,779,474 | A | * | 7/1998 | Gonser .................. A61C 1/057 433/132 |
| 10,117,724 | B2 | | 11/2018 | Nakahara |
| 2004/0005104 | A1 | | 1/2004 | Ruetter et al. |

FOREIGN PATENT DOCUMENTS

| | | | |
|---|---|---|---|
| DE | 102012000757 A1 | * 7/2013 | ............. A61C 1/181 |
| DE | 102012000757 A1 | 7/2013 | |
| JP | 2003-135486 A | 5/2003 | |
| JP | 2011-117548 A | 6/2011 | |
| JP | 2013-253689 A | 12/2013 | |
| SK | 1314-96 A3 | 5/1998 | |

OTHER PUBLICATIONS

Written Opinion dated May 16, 2017, issued by the International Searching Authority in counterpart International Patent Application No. PCT/JP2017/009102 (PCT/ISA/237).
Search Report dated Nov. 23, 2018 by the European Patent Office in counterpart European Patent Application No. 17763275.9.
Office Action dated Apr. 1, 2021, issued by the State Intellectual Property Office of P R. China in counterpart Chinese Patent Application No. 201911379644.5.
Office Action dated Mar. 15, 2022, issued by the United States Patent and Trademark Office in U.S. Appl. No. 16/728,014.

* cited by examiner

ROLLING BEARING, BEARING UNIT FOR AIR TURBINE, AND AIR TURBINE HANDPIECE FOR DENTAL USE

TECHNICAL FIELD

The present invention relates to a rolling bearing, a bearing unit for an air turbine, and an air turbine handpiece for dental use.

RELATED ART

For dental treatment, a small and lightweight air turbine handpiece is used in many cases.

For example, FIG. 25 depicts an air turbine handpiece 120 for dental use. The air turbine handpiece 120 for dental use has a grip part 121 and a head part 122 provided at a tip end portion of the grip part 121. An operator performs cutting processing for teeth with holding the grip part 121, for example.

The air turbine handpiece has a head housing (hereinafter, simply referred to as "housing") having an air supply port and an exhaust port, in which a rotary shaft having a turbine blade, to which compressed air from the air supply port is to be supplied, is rotatably accommodated. The rotary shaft is supported to the housing via a rolling bearing so as to be rotatable at high speed. The operator operates the air turbine handpiece while rotating a tool for treatment mounted to the rotary shaft at high speed, thereby cutting the teeth, for example.

Patent Document 1 discloses an air turbine handpiece in which a rolling bearing is provided with a heat-resistant mechanical seal. When a pressure of the compressed air is applied, i.e., when the rotary shaft having the turbine blade is rotated, the heat-resistant mechanical seal is elastically deformed so as to contact the rolling bearing, thereby shielding the compressed air. Thereby, lubricant in the rolling bearing is prevented from being leaked by an influence of the compressed air that is to be applied during the use. On the other hand, when the pressure of the compressed air is not applied, i.e., when the rotary shaft is not rotated, the seal returns to an initial state so as not to be in contact with the rolling bearing. Thereby, upon start of the rotation, a friction resistance between the heat-resistant mechanical seal and the rolling bearing is removed, so that the tool for treatment mounted to the rotary shaft can be smoothly activated.

CITATION LIST

Patent Documents

Patent Document 1: JP-A-2003-135486

SUMMARY OF THE INVENTION

Problems to be Solved by the Invention

The air turbine handpiece is used with rotating at ultrahigh speed of about 400,000 $min^{-1}$. In the meantime, when an operation of stopping the rotation is performed, i.e., when the supply of the compressed air is stopped, it is required to promptly stop the rotation of the rolling bearing.

However, when the pressure of the compressed air is applied to the heat-resistant mechanical seal of the rolling bearing disclosed in Patent Document 1, i.e., when the rotary shaft having the turbine blade mounted thereto is rotated, the heat-resistant mechanical seal is contacted to the rolling bearing configured to support the rotary shaft, so that a resistance of the rolling bearing is increased. For this reason, the rolling bearing is not suitable for rotation at ultrahigh speed of about 400,000 $min^{-1}$. Also, when the supply of the compressed air is stopped, the heat-resistant mechanical seal is not contacted to the rolling bearing, so that the friction resistance of the rolling bearing is reduced. Accordingly, it is disadvantageous to promptly stop the rolling bearing. Also, Patent Document 1 discloses a contact shield configured by a seal body and a seal support ring. However, stiffness of the contact shield is high, and a high air pressure is required when the contact shield is used for rotation at ultrahigh speed of about 400,000 $min^{-1}$.

The present invention has been made in view of the above situations, and a first object thereof is to provide a rolling bearing, a bearing unit for an air turbine and an air turbine handpiece for dental use capable of implementing rotation at ultrahigh speed, which is higher than the related art, and prompt stop of the rotation.

Also, a second object is to provide a rolling bearing, a bearing unit for an air turbine and an air turbine handpiece for dental use capable of implementing rotation at ultrahigh speed with a low air pressure and prompt stop of the rotation.

Means for Solving the Problems

The above objects of the present invention are accomplished by following configurations.

(1) A bearing unit for an air turbine including:

a turbine blade configured to rotate with receiving compressed air, a rotary shaft having the turbine blade integrally fixed thereto and capable of mounting a tool thereto, and a rolling bearing configured to rotatably support the rotary shaft to a housing, wherein the rolling bearing includes:

an outer ring fixed to the housing, an inner ring fixed to the rotary shaft, a plurality of rolling elements rollably arranged between the outer ring and the inner ring, and a seal member fixed to an inner peripheral surface of the outer ring and configured to seal a bearing internal space between the outer ring and the inner ring, wherein an axial end, which is positioned at a downstream side with respect to a supply direction of the compressed air, of an outer peripheral surface of the inner ring has an inclined surface having a diameter that changes from large to small toward the downstream side with respect to the axial supply direction of the compressed air, wherein the seal member is configured only by an elastic material without a metal core, and has a base part extending in a radial direction and a lip part extending from a radially inner end of the base part and inclined to the downstream side with respect to the supply direction of the compressed air toward a radially inner side, wherein when the compressed air is not applied, an inclined surface, which is positioned at an upstream side with respect to the supply direction of the compressed air, of the lip part of the seal member is in contact with the inclined surface of the inner ring, and wherein when the compressed air is applied, a contact area between the inclined surface, which is positioned at the upstream side with respect to the supply direction of the compressed air, of the lip part of the seal member and the inclined surface of the inner ring becomes smaller, as compared to when the compressed air is not applied.

(2) A bearing unit for an air turbine including:
a turbine blade configured to rotate with receiving compressed air,
a rotary shaft having the turbine blade integrally fixed thereto and capable of mounting a tool thereto, and
a rolling bearing configured to rotatably support the rotary shaft to a housing,
wherein the rolling bearing includes:
an outer ring fixed to the housing,
an inner ring fixed to the rotary shaft,
a plurality of rolling elements rollably arranged between the outer ring and the inner ring, and
a seal member fixed to an inner peripheral surface of the outer ring and configured to seal a bearing internal space between the outer ring and the inner ring,
wherein at least a part, with which a lip part is in contact, of an outer peripheral surface of the inner ring is configured as a cylindrical surface,
wherein the seal member is configured only by an elastic material without a metal core, and has a base part extending in a radial direction and the lip part extending from a radially inner end of the base part and inclined to a downstream side with respect to a supply direction of the compressed air toward a radially inner side,
wherein when the compressed air is not applied, an inner peripheral surface of the lip part of the seal member is in contact with the cylindrical surface of the inner ring, and
wherein when the compressed air is applied, a contact area between the inner peripheral surface of the lip part of the seal member and the cylindrical surface of the inner ring becomes smaller, as compared to when the compressed air is not applied.
(3) The bearing unit for an air turbine according to (1) or (2), wherein when the compressed air is applied, the seal member is not in contact with the outer peripheral surface of the inner ring.
(4) An air turbine handpiece for dental use including the bearing unit for an air turbine according to one of (1) to (3).

Effects of the Invention

According to the rolling bearing, the bearing unit for an air turbine and the air turbine handpiece for dental use of the present invention, it is possible to implement both the rotation at ultrahigh speed, which is higher than the related art, and the prompt stop of the rotation.

Also, according to the rolling bearing, the bearing unit for an air turbine and the air turbine handpiece for dental use of the present invention, since the substantially annular member is configured only by the elastic member and the seal stiffness can be lowered, it is possible to increase the number of revolutions of the rolling bearing with a low air pressure.

DETAILED DESCRIPTION OF EMBODIMENTS

Hereinafter, embodiments of a rolling bearing for an air turbine and a bearing unit for an air turbine of the present invention will be described in detail with reference to the drawings. Meanwhile, in the below, an example where the bearing unit for an air turbine of the present invention is applied to an air turbine handpiece for dental use will be described. However, the present invention can be applied to other utilities, for example, a home electronics motor, as well.

First Embodiment

Figure 1:
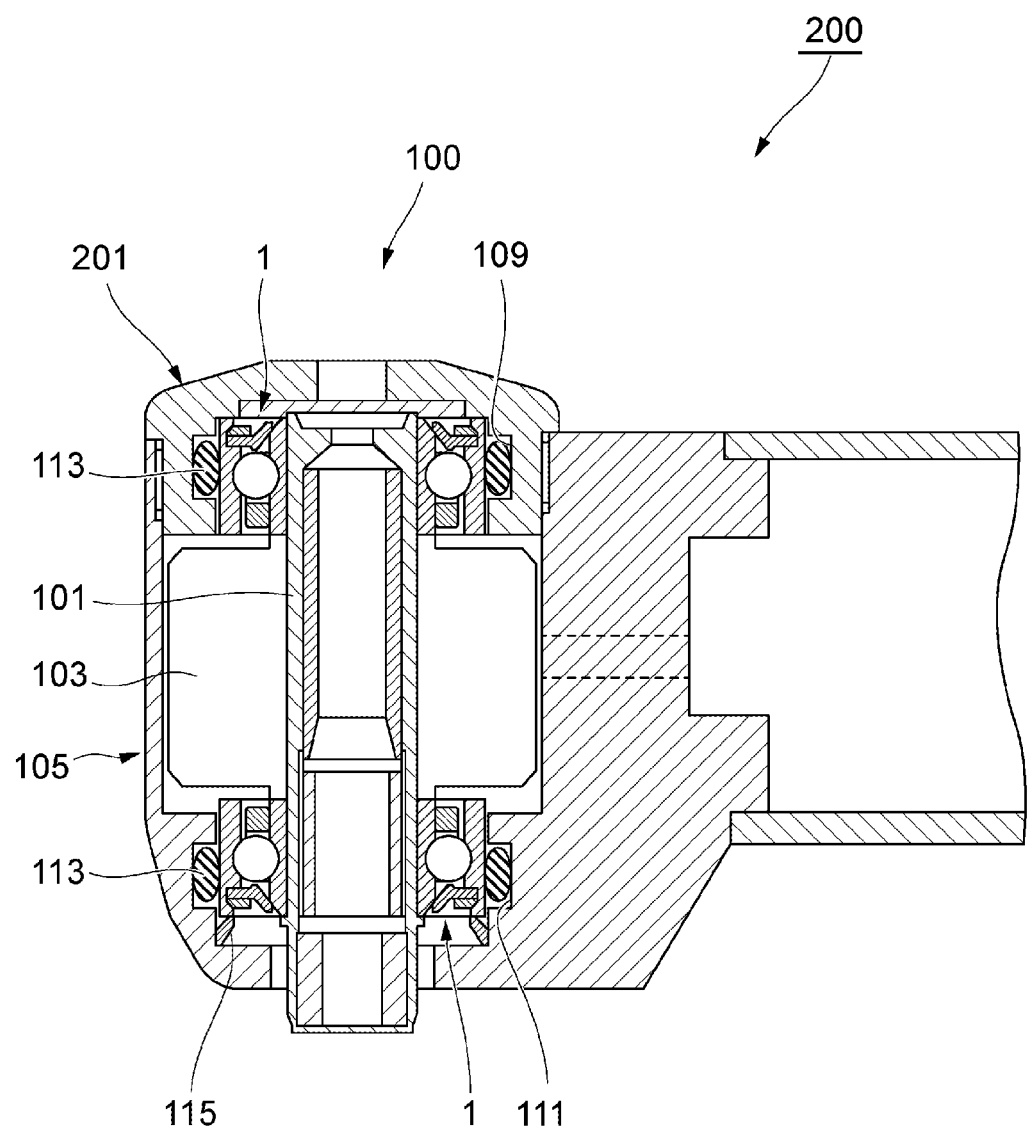
FIG. 1 is a sectional view of main parts of an air turbine handpiece for dental use of a first embodiment.

FIG. 1 is a sectional view of main parts of an air turbine handpiece for dental use of a first embodiment.
A bearing unit 100 for an air turbine is mounted to a head part 201 of an air turbine handpiece 200 for dental use. The bearing unit 100 for an air turbine includes a turbine blade 103 configured to rotate with receiving compressed air, a rotary shaft 101 having the turbine blade 103 integrally fixed thereto and capable of mounting a tool (for example, a tool for dental treatment) to an end thereof, and a pair of rolling bearings 1 for an air turbine (hereinafter, referred to as 'rolling bearing') configured to rotatably support the rotary shaft 101 to a housing 105.

The respective rolling bearings 1 are supported to the housing 105 via rubber rings 113 mounted to annular concave parts 109, 111 of the housing 105. Also, one rolling bearing 1 is urged toward the other rolling bearing 1 by a spring washer 115.

Figure 2:
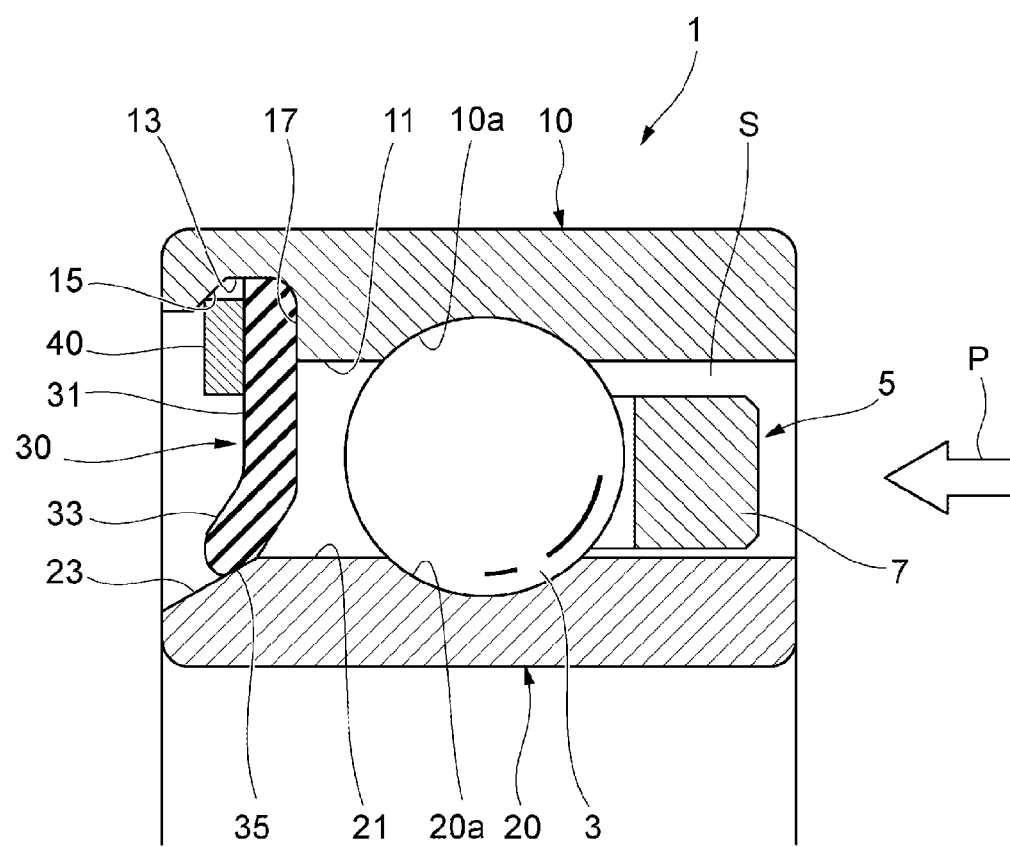
FIG. 2 is a partial sectional view depicting a stop state of a rolling bearing of the first embodiment.

FIG. 2 is a partial sectional view depicting a stop state of the rolling bearing of the first embodiment.

The rolling bearing 1 is a bearing including an outer ring 10 having an outer ring raceway 10a, an inner ring 20 having an inner ring raceway 20a, a plurality of balls (rolling elements) 3 rollably arranged between the outer ring 10 and the inner ring 20, and a cage 5 configured to rollably hold the plurality of balls 3. In the meantime, the rolling bearing is not limited to the shown bearing, and may also be an angular-type bearing. The outer ring 10 is held in the housing 105 via the rubber ring 113 shown in FIG. 1. The inner ring 20 is fixed to the rotary shaft 101. The cage 5 is a so-called crown-type cage, and a substantially circular ring-shaped rim part 7 is located at a more upstream side with respect to a supply direction of the compressed air than the ball 3, i.e., at a right side in FIG. 2. An arrow P in FIG. 2 indicates a flow direction of the compressed air.

A circular ring-shaped seal member 30 is provided between the outer ring 10 and the inner ring 20, and is configured to seal a bearing internal space S between an inner peripheral surface 11 of the outer ring 10 and an outer peripheral surface 21 of the inner ring 20 over an entire circumference. The seal member 30 consists of an elastic body made only by an elastic material without a metal core. An outer peripheral part of the seal member 30 is fixed to a groove portion 13 formed in the inner peripheral surface of the outer ring 10 by a snap ring 40, so that an inner peripheral part thereof can be elastically deformed in an axial direction and a radial direction of the bearing.

As the elastic member configuring the seal member 30, for example, an acryl rubber having Shore A hardness (Japanese Industrial Standards K 6253) of 60 to 90, a fluorine-contained rubber having Shore A hardness of 60 to 90, and the like can be used. The seal member 30 is formed with the above material, so that an appropriate elastic characteristic is obtained and durability and wear resistance are also improved.

Particularly, since the air turbine handpiece for dental use is subjected to high-temperature cleaning/sterilization treatments after the use, the acryl rubber or fluorine-contained rubber having water resistance and steam (high temperature/high humidity) resistance is preferably used.

The seal member 30 is provided at a bearing end portion positioned at a more downstream side with respect to the supply direction of the compressed air than the ball 3, i.e., at a left bearing end portion in FIG. 2. That is, the seal member 30 is provided at one axial end portion of the bearing internal space S opposite to a compressed air supply side (an inlet of the compressed air). The inner peripheral surface 11 of the outer ring 10 is formed with the groove portion 13 for fixing therein the seal member 30. The seal member 30 is fixed to the groove portion 13 by the snap ring 40. A shape of the seal member 30 is not limited to a circular ring shape, and may be another shape inasmuch as the shape is substantially annular, as described later.

The outer peripheral surface 21 of the inner ring 20 has an inclined surface 23 at a downstream side with respect to the supply direction of the compressed air, i.e., at a left end portion in FIG. 2. The inclined surface 23 is formed to have a conical surface shape inclined so that a diameter changes from large to small toward the downstream side with respect to the axial supply direction of the compressed air.

Figure 3:
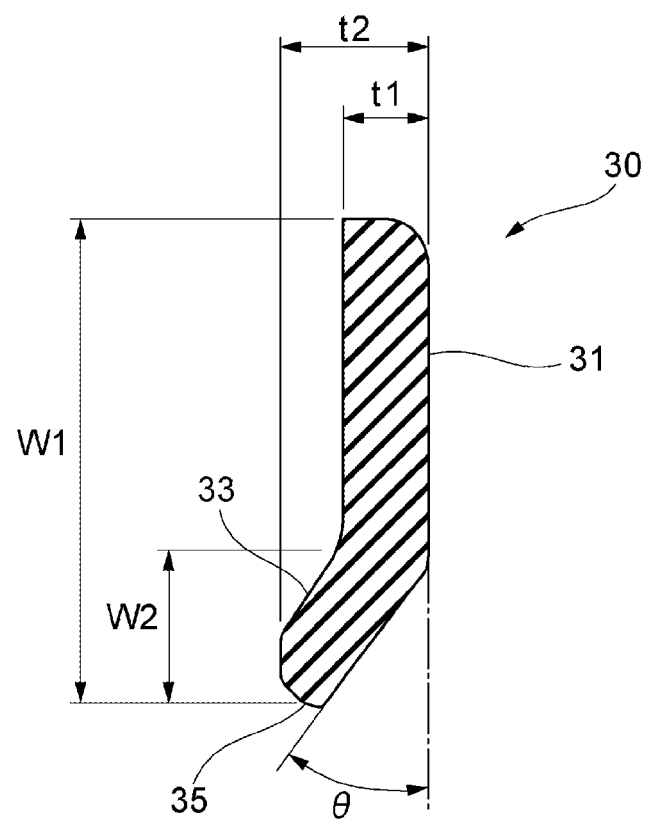
FIG. 3 is a sectional view of a seal member.

FIG. 3 is a sectional view of the seal member 30.

The seal member 30 has a circular ring-shaped base part 31 extending in the radial direction and an elastically deformable lip part 33 extending from a radially inner end of the base part 31 and inclined to the downstream side with respect to the supply direction of the compressed air toward a radially inner side. An inclination angle θ of an inclined surface of the lip part 33 of the seal member 30, which is positioned at the upstream side with respect to the supply direction of the compressed air, relative to the base part 31 is 30° to 80°, preferably 40° to 70°, and more preferably 45° to 65°. For example, when the inclination angle θ is set to 55° within the above range, a balance between a friction resistance and flow of the compressed air becomes favorable. When the inclination angle θ is smaller than the above range, a contact resistance excessively increases, and when the inclination angle is greater than the above range, a flow resistance of the compressed air excessively increases, so that intended performance to be described later is not obtained.

As shown in FIG. 2, a radially outer end portion of the base part 31 of the seal member 30 is inserted in the groove portion 13 together with the snap ring 40 and is fixed to the groove portion 13. The groove portion 13 has a tapered surface 15 inclined to a radially outer side toward an axially inner side, an axially inner surface 17 with which an axial side surface of the base part 31 is in contact at a more axially inner side than the tapered surface 15, and an inner cylinder-shaped groove bottom surface connecting the tapered surface 15 and the axially inner surface 17 each other. An outer diameter of the snap ring 40 can be reduced by elastic deformation, such as a C-shaped ring. The base part 31 of the seal member 30 and the snap ring 40 are interposed and fixed between the tapered surface 15 and the axially inner surface 17. An outer diameter-side end portion of an axially outer side of the snap ring 40 is linearly contacted to the tapered surface 15 along a circumferential direction. In this state, the outer diameter of the snap ring 40 is reduced by the elastic deformation, as compared to a free state. A pressing force generated as a result of the elastic deformation presses the tapered surface 15, thereby generating a force of pressing the snap ring 40 toward the radially outer side and a force of pressing the snap ring 40 toward the axially inner side. The force of pressing the snap ring 40 toward the axially inner side presses the seal member 30 toward the axially inner surface 17, so that the seal member 30 is fixed to the outer ring 10. In the meantime, the snap ring 40 may have a circular section, other than a rectangular section. Also, the snap ring 40 may be provided with an inclined surface, the groove portion 13 may be formed to have a rectangular section, and a corner portion of the groove portion 13 having the rectangular section may be pressed to the inclined surface of the snap ring 40.

The lip part 33 is inclined to the downstream side (the axially outer side) with respect to the supply direction of the compressed air toward the radially inner side, and the inclined surface thereof positioned at the upstream side with respect to the supply direction of the compressed air is in contact with the inclined surface 23 of the inner ring 20. The inclination angle θ of the inclined surface of the lip part 33 positioned at the upstream side with respect to the supply direction of the compressed air is set smaller than an inclination angle of the inclined surface 23 of the inner ring 20. For this reason, an elastic deformation amount of the lip part 33 increases toward an inner diameter side.

Figure 4:
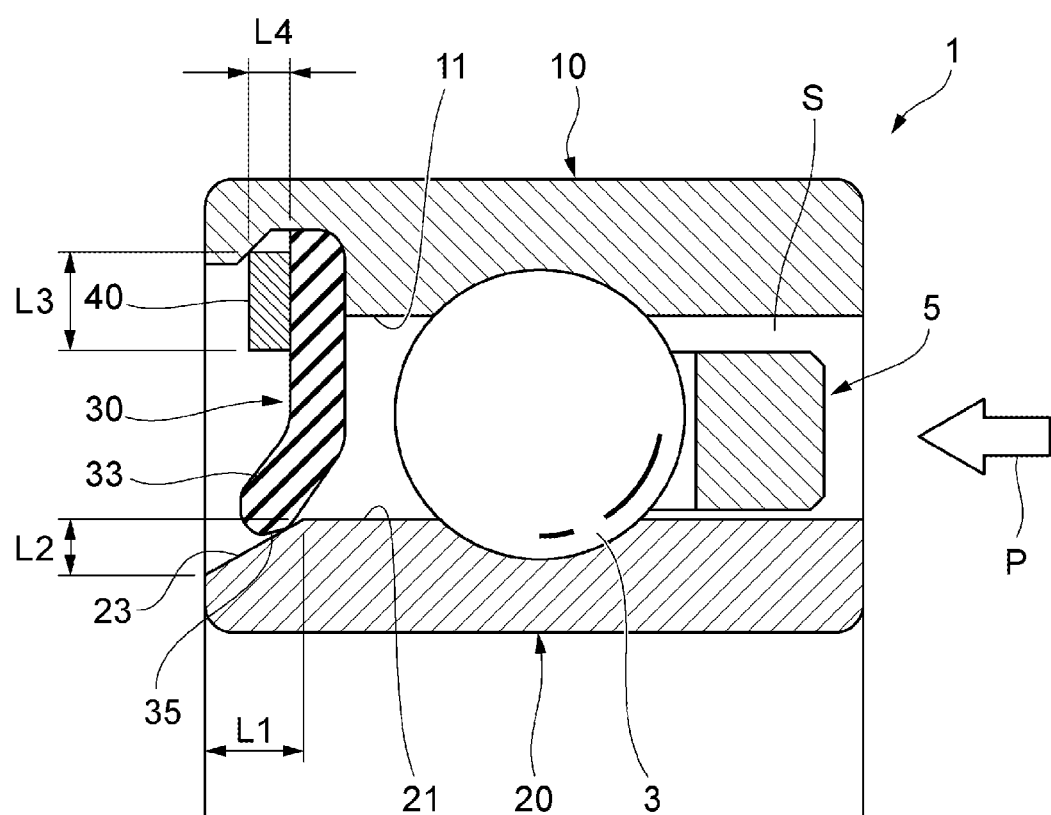
FIG. 4 is a partial sectional view depicting an operating state of the rolling bearing of the first embodiment.

FIG. 4 is a partial sectional view depicting an operating state of the rolling bearing of the first embodiment.

When the air turbine handpiece 200 for dental use is driven and the compressed air is thus supplied to the turbine blade 103, the supplied compressed air is introduced into the bearing internal space S of the bearing unit 100 for an air turbine (refer to FIG. 1) configured as described above, and a pressure of the compressed air is applied to the seal member 30. Then, the seal member 30 is elastically deformed toward the downstream side with respect to the flow of the compressed air. As a result, as compared to when the pressure of the compressed air is not applied, a contact area between an inner peripheral surface 35 of the lip part 33 and the inclined surface 23 of the inner ring 20 is reduced. That is, the lip part 33 is in an open state in which the compressed air is enabled to communicate.

Since the seal member 30 is configured only by the elastic material without a metal core, the seal member is likely to be elastically deformed, as a whole. For this reason, when the compressed air exceeding a specific pressure is applied to the seal member 30, the inner peripheral part of the seal member 30 is elastically deformed outward in the axial direction, and the contact area between the inclined surface of the lip part 33 positioned at the upstream side with respect to the supply direction of the compressed air and the inclined surface 23 of the inner ring 20 is reduced.

Like this, in the above configuration, even when the supply pressure of the compressed air is relatively low, the lip part 33 of the seal member 30 is securely elastically deformed, so that the contact area can be reduced.

Thereby, it is possible to perform smooth activation of an air turbine, to reduce the friction resistance between the seal member 30 and the inner ring 20, and to implement rotation of the rotary shaft 101 at ultrahigh speed of about 400,000 min$^{-1}$. Also, the inclined surface 23 is provided at the end portion of the outer peripheral surface 21 of the inner ring 20, which is positioned at the downstream side with respect to the supply direction of the compressed air, so that the flow of the compressed air passing between the lip part 33 and the inclined surface 23 becomes smooth and the rotation at ultrahigh speed, which is higher than the related art, can be implemented.

On the other hand, when the driving of the air turbine handpiece 200 for dental use is stopped and the supply of the compressed air to the turbine blade 103 is thus stopped, the pressure of the compressed air being applied to the lip part 33 is reduced. Then, the inclined surface of the lip part 33, which is positioned at the upstream side with respect to the supply direction of the compressed air, is surface-contacted to the inclined surface 23 of the inner ring 20 while generating the pressing force. Thereby, the lip part 33 functions as a brake of the inner ring 20.

Also, since the inclined surface of the lip part 33 of the seal member 30, which is positioned at the upstream side with respect to the supply direction of the compressed air, is configured to contact the inclined surface 23 of the inner ring 20, slight axial displacement of the lip part 33 can largely lower the friction resistance between the lip part 33 and the inclined surface 23. Also, during the stop, since the contact area between the lip part 33 and the inclined surface 23 is large, the high friction resistance is generated, so that the excellent brake effect is obtained. Also, since the contact area between the lip part 33 and the inclined surface 23 is large, it is possible to obtain the high seal effect during the stop. That is, it is possible to reduce the contact pressure with the pressure of the compressed air lower than the conventional structure, and to implement both the additional improvement on the rotating speed of the rotary shaft 101 and the shortening of the stop time. The balance between the rotating speed of the rotary shaft 101 and the brake performance can be optimally set by adjusting the inclination of the inclined surface 23, a thickness of the seal member 30 and the inclination angle of the inclined surface of the lip part 33, which is positioned at the upstream side with respect to the supply direction of the compressed air.

Particularly, for the air turbine handpiece 200 for dental use, the rotation at extremely high speed is required upon cutting of teeth, and the prompt rotation stop performance within 2 seconds, preferably one second is required upon the stop. According to the above configuration, since the effects of increasing the rotating speed and shortening the stop time are stably accomplished, it is possible to considerably improve the usability of the air turbine handpiece 200 for dental use.

When driving the air turbine handpiece 200 for dental use, the compressed air is difficult to be leaked from an inside of the bearing, so that a noise is reduced upon the driving and the high quietness is thus obtained.

Also, as shown in FIG. 1, in the pair of rolling bearings 1 arranged to the rotary shaft 101, the seal member 30 is arranged at one axial end portion of the outer ring 10, which is opposite to the inlet of the compressed air. Thereby, the spray lubrication is performed from between the pair of rolling bearings 1, so that lubricant can be supplied into each rolling bearing 1 from a bearing end portion-side at which the seal member 30 is not arranged. Also, since the seal member 30 is arranged at the opposite side to the spray-lubrication side, the liquid leakage from each rolling bearing 1 to an outside of the head part 201 is prevented upon the lubrication.

In general, the air turbine handpiece 200 for dental use is subjected to high-temperature cleaning/sterilization treatments after the use. By the treatments, an amount of the lubricant in the rolling bearings 1 is reduced. However, since the seal member 30 is arranged only at one axial end portion of the rolling bearing 1, the lubricant can be easily supplied from the other axial end portion. For this reason, it is possible to keep the rolling bearings 1 in a favorable lubrication state all the time, so that it is possible to stably rotate the rotary shaft 101.

Second Embodiment

Subsequently, a second embodiment of the bearing unit 100 for an air turbine is described. In the below, the same members and parts as the first embodiment are denoted with the same reference numerals, so that the descriptions thereof are simplified or omitted.

Figure 5:
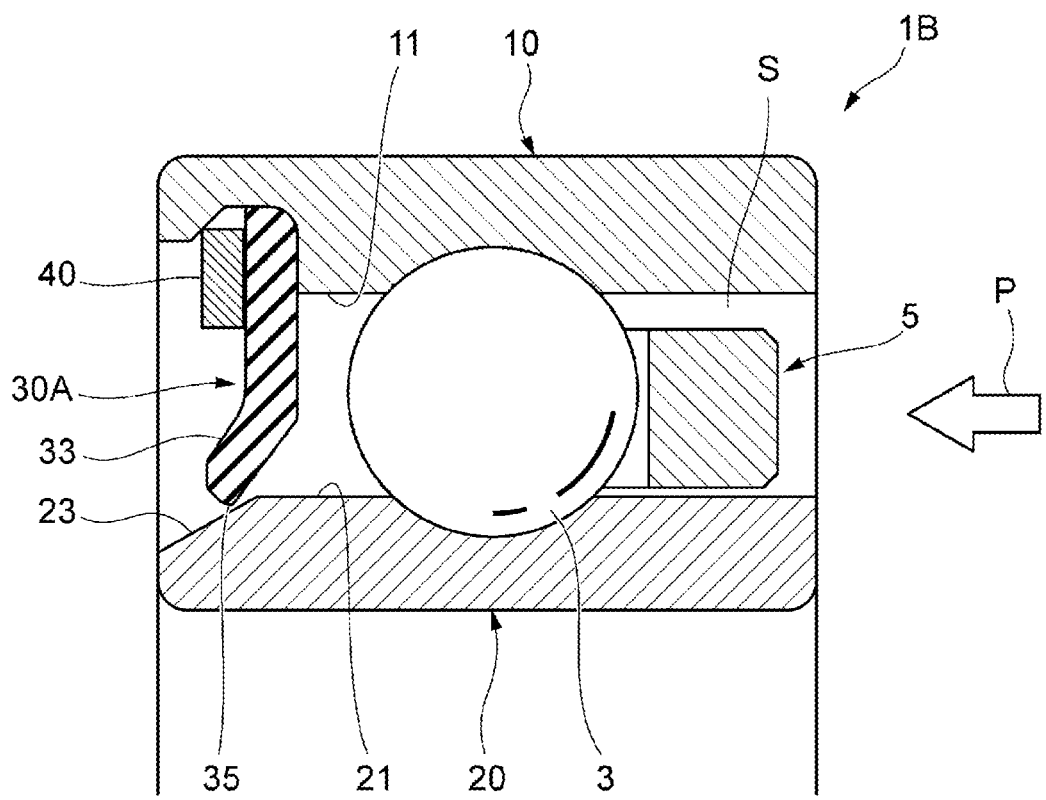
FIG. 5 is a partial sectional view depicting a rolling bearing of a second embodiment.

FIG. 5 is a partial sectional view depicting a rolling bearing of a second embodiment.

In the second embodiment, when the compressed air is introduced into the bearing internal space S and the pressure of the compressed air is applied to a seal member 30A, the seal member 30A is in a state where the inclined surface of the lip part 33, which is positioned at the upstream side with respect to the supply direction of the compressed air, and the inclined surface 23 of the inner ring 20 are not completely contacted each other. The non-contact state is kept by the compressed air flowing between the lip part 33 and the inclined surface 23.

On the other hand, when the pressure of the compressed air is not applied to the seal member 30A, the inclined surface of the lip part 33, which is positioned at the upstream side with respect to the supply direction of the compressed air, is in contact with the inclined surface 23 of the inner ring 20 over an entire circumference.

According to the seal member 30A configured as described above, when the pressure of the compressed air is applied to the seal member 30A, the friction resistance generated as a result of the contact between the seal member 30A and the inner ring 20 is completely removed, so that it is possible to implement the rotation at ultrahigh speed, which is higher than the first embodiment. The other operational effects are similar to the first embodiment.

Third Embodiment

Subsequently, a third embodiment of the bearing unit 100 for an air turbine is described.

Figure 6:
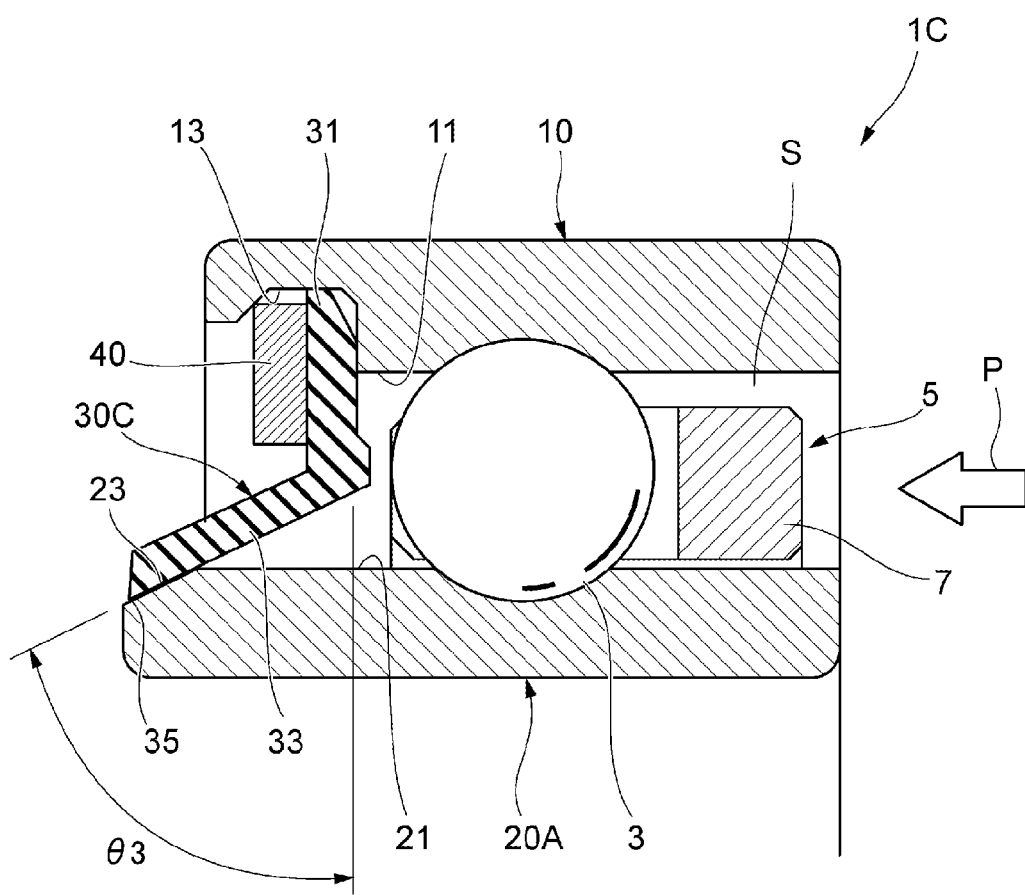
FIG. 6 is a partial sectional view depicting a rolling bearing of a third embodiment.

FIG. 6 is a partial sectional view depicting a rolling bearing of a third embodiment.

In a rolling bearing 1C of the third embodiment, an inner ring 20A more extends outward in the axial direction than the outer ring 10, and a seal member 30C more protrudes outward in the axial direction than the outer ring 10.

Like the first and second embodiments, the inner ring 20A has the inclined surface 23 at an end portion of the outer peripheral surface 21, which is a downstream side with respect to the supply direction of the compressed air, i.e., at one end portion of the outer peripheral surface 21, which is located at the left side in FIG. 6. The inclined surface 23 has a conical surface of which a diameter changes from large to small toward the downstream side with respect to the axial supply direction of the compressed air.

Also, the seal member 30C is configured so that the inclined surface of the lip part 33 positioned at the upstream side with respect to the supply direction of the compressed air is in contact with the inclined surface 23 of the inner ring 20A at a more axially outer side than the outer ring 10.

According to the above configuration, an inclination angle θ3 of the inclined surface of the lip part 33, which is positioned at the upstream side with respect to the supply direction of the compressed air, from the radial direction can be set greater than the inclination angle θ of the first and second embodiments. For this reason, it is possible to more smoothly perform the operation of opening and closing the lip part 33 by the compressed air. The other operational effects are similar to the first and second embodiments.

Fourth Embodiment

Subsequently, a fourth embodiment of the bearing unit 100 for an air turbine is described.

Figure 7:
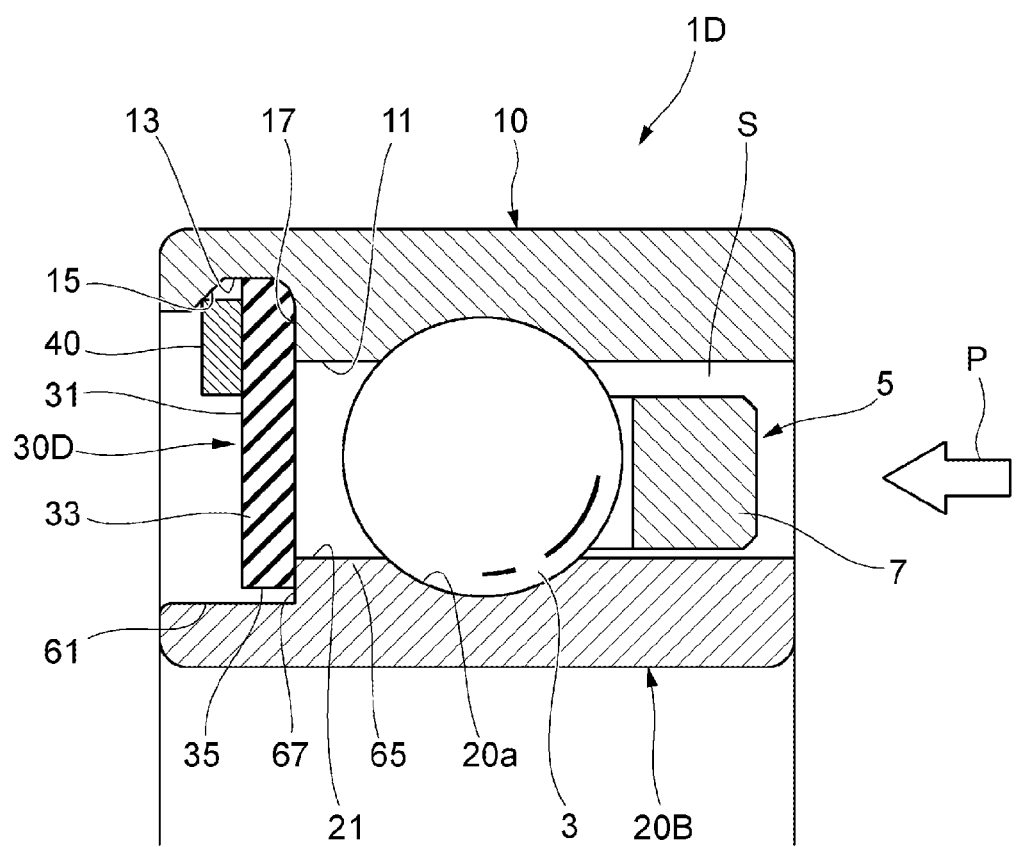
FIG. 7 is a partial sectional view depicting a rolling bearing of a fourth embodiment.

FIG. 7 is a partial sectional view depicting a rolling bearing of a fourth embodiment.

In a rolling bearing 1D of the fourth embodiment, one end portion of the outer peripheral surface 21 of an inner ring 20B, which is a downstream side with respect to the supply direction of the compressed air, is formed with a small-diameter part 61. The outer peripheral surface 21 is formed with a step surface 67 between a shoulder part 65 connecting to the inner ring raceway 20a and the small-diameter part 61. The step surface 67 is configured by a wall surface formed over an entire circumference as a result of the radial cutting.

A seal member 30D has an elastically deformable flat circular disc shape, and is mounted to the groove portion 13 of the outer ring 10 so that a radially inner part of an upstream surface with respect to the supply direction of the compressed air is in contact with the wall surface of the step surface 67 with being elastically deformed to have the pressing force in the axial direction. In the shown example, the seal member 30D has the elastically deformable flat circular disc shape, and the step surface 67 is a wall surface substantially perpendicular to the axial direction. However, the present invention is not limited thereto. For example, one or both of the radially inner part of the seal member 30D and the step surface 67 may be slightly inclined from the radial direction.

According to the above configuration, since the lip part 33 of the seal member 30D is configured to axially contact the step surface 67 of the inner ring 20B, it is possible to reduce a contact pressure between the seal member 30D and the step surface 67, as compared to a configuration where the seal member and the step surface are contacted each other in the radial direction. Thereby, since it is possible to simply process the seal member 30D and the inner ring 20B, it is possible to save the manufacturing cost and to accomplish the similar effects to the first to third embodiments.

Fifth Embodiment

Subsequently, a fifth embodiment of the bearing unit 100 for an air turbine is described.

The rolling bearing of the fifth embodiment is similar to the first embodiment, except that a cage 7 is configured as an outer ring guide type.

According to the above configuration, the cage is arranged at the outer ring-side, and an inner gap between the outer peripheral surface of the inner ring and an inner peripheral surface of the cage is greater than an outer gap of the outer ring-side. Thus, when the compressed air is introduced into the bearing internal space, the compressed air flows toward the seal member mainly through the inner gap, which is a radially inner space of the plurality of balls (rolling elements) arranged between the outer ring and the inner ring, and is ejected to the lip part of the seal member.

The compressed air is directly ejected to the lip part, so that the seal member can be securely elastically deformed even when the supply pressure of the compressed air is relatively low. Thereby, it is possible to perform the operation of opening and closing the seal member by the compressed air more smoothly and in a higher responsiveness manner.

Sixth Embodiment

Subsequently, a sixth embodiment of the bearing unit 100 for an air turbine is described.

Figure 8:
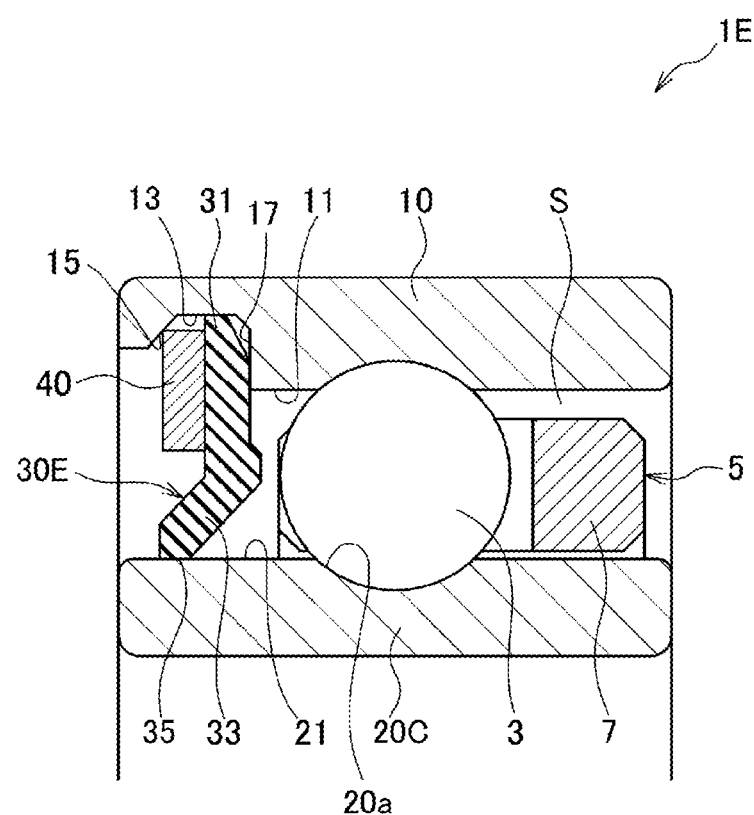
FIG. 8 is a partial sectional view depicting a rolling bearing of a sixth embodiment.

FIG. 8 is a partial sectional view depicting a rolling bearing of a sixth embodiment.

A rolling bearing 1E of the sixth embodiment is similar to the first embodiment, except that a shape of the lip part 33 of a seal member 30E is different and at least a part, with which the lip part 33 is in contact, of the outer peripheral surface 21 of an inner ring 20C is a cylindrical surface.

The lip part 33 of the seal member 30E has a conical shape inclined (in a direction from right to left, in FIG. 8) to the downstream side with respect to the supply direction of the compressed air toward the radially inner side. That is, the lip part 33 is inclined outward in the axial direction toward the radially inner side. An inner peripheral surface of a radially inner periphery end of the lip part 33 of the seal member 30E is configured as an inner cylinder surface parallel with the axis. The inner cylinder surface, which is the inner peripheral surface of the lip part 33, is in contact with the cylindrical surface of the outer peripheral surface 21 of the inner ring 20C. In this way, the seal member 30E is configured to seal the bearing internal space S between the inner peripheral surface 11 of the outer ring 10 and the outer peripheral surface 21 of the inner ring 20C.

Figure 9:
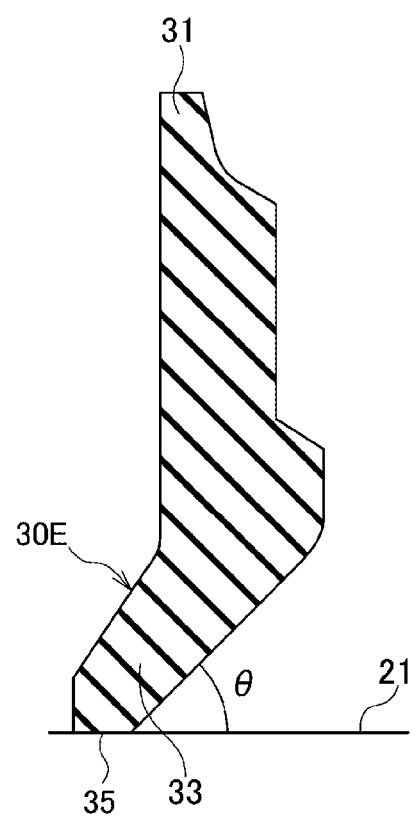
FIG. 9 is a sectional view for illustrating a contact angle of the seal member shown in FIG. 8.

In the meantime, FIGS. 8 and 9 depict the different shapes of the lip part 33. The lip part 33 may have a thickness that is uniform toward the radially inner side, as shown in FIG. 8, or may have a thickness that gradually decreases toward the radially inner side, as shown in FIG. 9.

Figure 10:
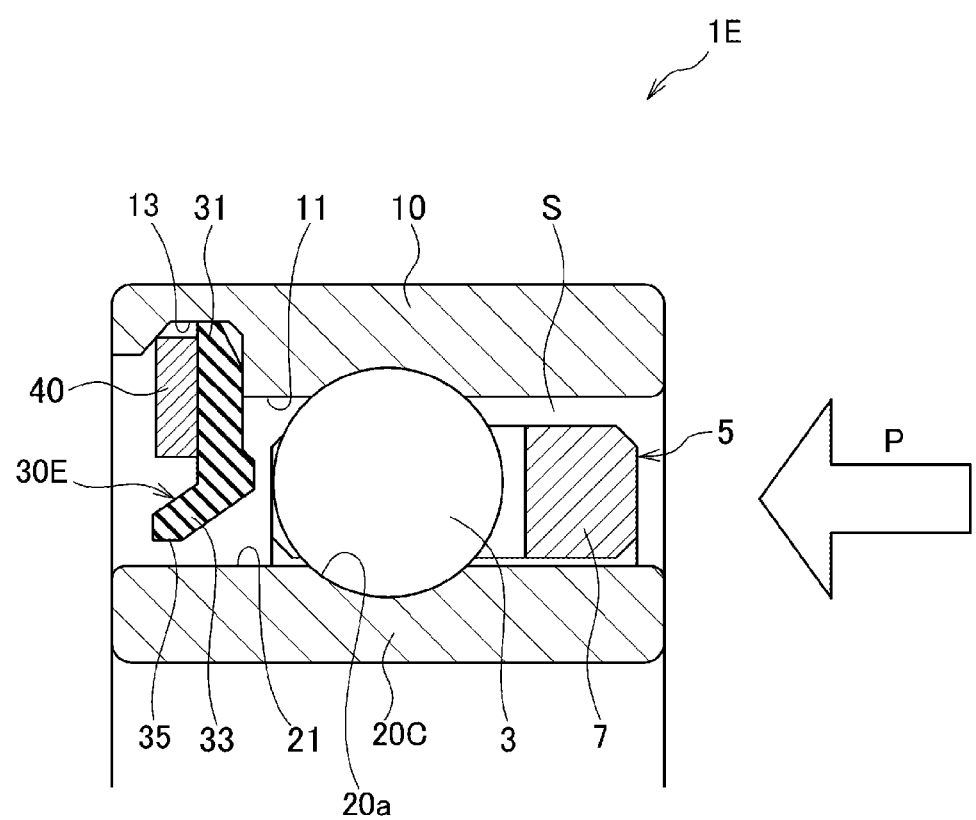
FIG. 10 is a partial sectional view depicting a rolling bearing of the sixth embodiment.

FIG. 10 is a partial sectional view depicting an operating state of the rolling bearing of the sixth embodiment. The arrow P in FIG. 10 indicates the flow direction of the compressed air.

Figure 11:
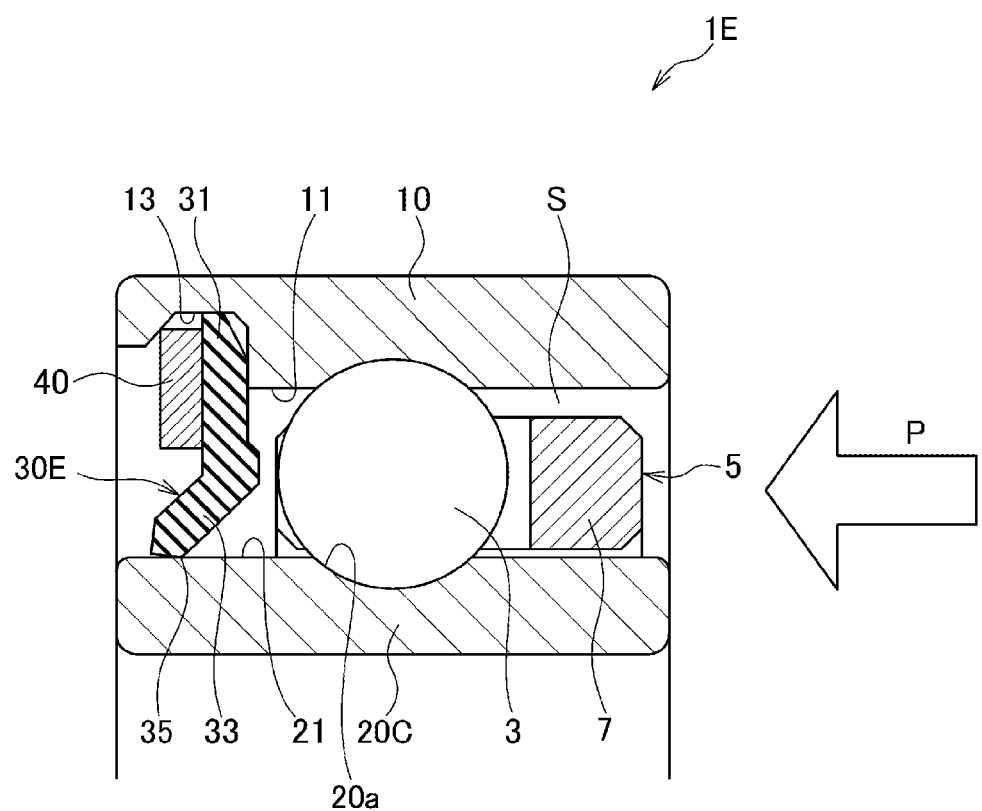
FIG. 11 is a partial sectional view depicting an operating state of a rolling bearing of a modified embodiment of the sixth embodiment.

When the compressed air is supplied to the turbine blade so as to drive the air turbine handpiece, the compressed air flows in the bearing internal space S from the right toward the left in FIG. 10. The compressed air is applied to the seal member 30E, thereby elastically deforming the lip part 33 so that an inner diameter thereof increases. Accordingly, when the compressed air is applied, the contact area between the inner peripheral surface of the radially inner periphery end of the lip part 33 and the outer peripheral surface 21 of the inner ring 20A is reduced, as compared to when the compressed air is not applied. In the example of FIG. 10, the inner peripheral surface of the radially inner periphery end of the lip part 33 is not in contact with the outer peripheral surface 21 of the inner ring 20C, and the contact area is zero. That is, the lip part 33 is in an opened state. Also, like an example of FIG. 11, a configuration is also possible in which when the compressed air is applied, the inner peripheral surface of the radially inner periphery end of the lip part 33 and the outer peripheral surface 21 of the inner ring 20C are in contact with each other and the contact area between the inner peripheral surface 35 of the lip part 33 and the outer peripheral surface 21 of the inner ring 20C is reduced, as compared to when the compressed air is not applied.

Particularly, in the sixth embodiment, since the seal member 30E is configured only by the elastic material without a metal core, the seal member is likely to be elastically deformed, as a whole. For this reason, when the compressed air exceeding a specific pressure is applied to the seal member 30E, the inner peripheral part of the seal member 30E is elastically deformed outward in the axial direction, and the contact area between the inner peripheral surface of the lip part 33 and the inclined surface 23 of the inner ring 20 is reduced.

In the meantime, when the supply of the compressed air is stopped so as to stop the air turbine handpiece for dental use, the compressed air is not applied to the lip part 33, so that the lip part 33 returns to the state as shown in FIG. 8. The inner peripheral surface of the lip part 33 is surface-contacted to the outer peripheral surface 21 of the inner ring 20C with generating the pressing force. That is, the lip part 33 is in a closed state. Thereby, the lip part 33 functions as a brake of the inner ring 20C and the rotary shaft 101 (refer to FIG. 1), to which the inner ring 20C is fixed, so that it is possible to promptly stop the rotary shaft 101.

Also, the lip part 33 is formed to have an inclined shape that is inclined to the downstream side with respect to the supply direction of the compressed air toward the radially inner side and can be thus easily elastically deformed by the compressed air. Therefore, it is possible to perform the operation of opening and closing the lip part 33 by the compressed air with good sensitivity.

In the meantime, as shown in FIG. 9, the inclination angle θ of the lip part 33 of the seal member 30E is preferably set to 35° to 55°. Thereby, when the compressed air is applied, the air is efficiently applied to the lip part 33, so that it is possible to smoothly open the seal member 30E. As a result, it is possible to implement the rotation at ultrahigh speed with the low pressure of the compressed air.

Also, since at least the part, to which the lip part 33 is contacted, of the outer peripheral surface 21 of the inner ring 20C is configured as the cylindrical surface, it is possible to increase the contact area between the outer peripheral surface 21 of the inner ring 20C and the inner peripheral surface of the lip part 33, thereby improving the brake function of the lip part 33. Particularly, in the sixth embodiment, since the inner peripheral surface of the lip part 33 is surface-contacted to the cylindrical outer peripheral surface 21 of the inner ring 20C, it is possible to further improve the brake function of the lip part 33.

In the meantime, the radially inner peripheral surface of the lip part 33 may have a substantially triangular section. In this case, as compared to the above surface-contact configuration, the brake performance is lowered. However, when the compressed air is applied, it is possible to open the seal member 30E with the slight elastic deformation. Accordingly, it is possible to implement the rotation at ultrahigh speed with the low pressure of the compressed air.

Seventh Embodiment

Subsequently, a seventh embodiment of the bearing unit 100 for an air turbine is described.

Figure 12:
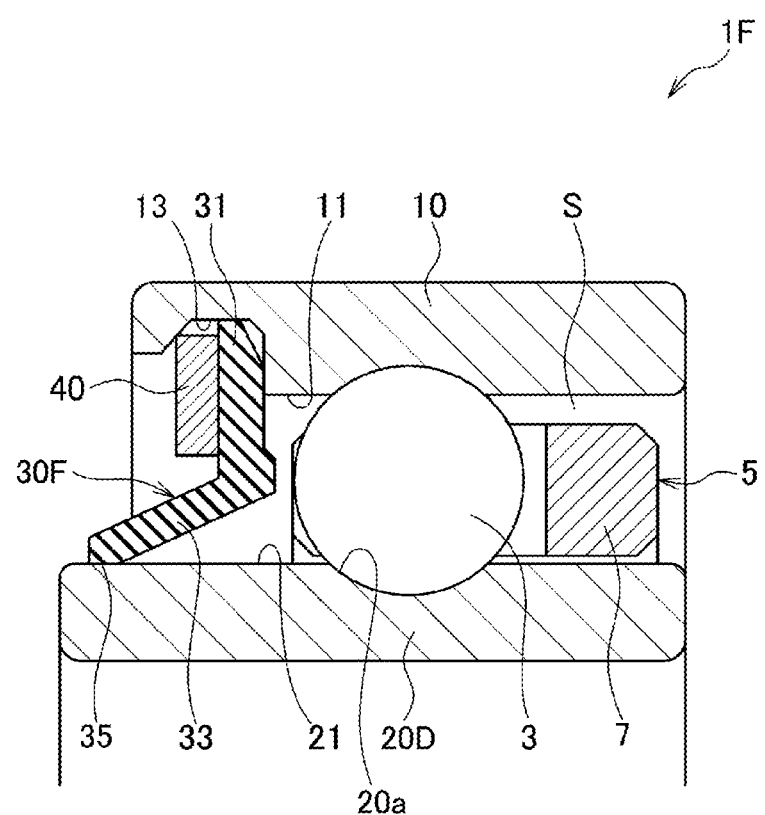
FIG. 12 is a partial sectional view depicting a rolling bearing of a seventh embodiment.

FIG. 12 is a partial sectional view depicting a rolling bearing of a seventh embodiment.

As shown in FIG. 12, an inner ring 20D of a rolling bearing 1F may more extend outward in the axial direction than the outer ring 10 and a seal member 30F may more extend outward in the axial direction than the outer ring 10, inasmuch as the seal performance is obtained. In this case, the inner peripheral surface of the lip part 33 of the seal member 30F is in contact with the outer peripheral surface 21 of the inner ring 20D at the more axially outer side than the outer ring 10. According to this configuration, since it is possible to largely incline the lip part 33, it is possible to more easily perform the operation of opening and closing the lip part 33 by the compressed air.

Other Embodiments

The present invention is not limited to the above embodiments, and can be appropriately modified and improved.

The cage 5 that is used for the rolling bearing 1 of the first to seventh embodiments is configured so that the rim part 7 provided at one end-side thereof is arranged at the more upstream side with respect to the supply direction of the compressed air than the ball 3. However, the present invention is not limited thereto. For example, the rim part 7 may be arranged at the seal member-side of the axially opposite side.

Also, since the seal member is arranged only at one axial end-side of the rolling bearing 1, the groove portion 13 of the outer ring 10, the inclined surface 23 of the inner rings 20, 20A of the first to fifth embodiments, and the step surface 67 are formed only at one axial end-side. However, the present invention is not limited thereto. For example, they may also be symmetrically formed at the other axial end-side. In this case, one of a pair of groove portions 13 is not used, and in the configurations of the first to fifth embodiments, a pair of inclined surfaces or steps is not used. In this case, in a process of assembling the rolling bearing, it is not necessary to consider a mounting direction, so that it is possible to simplify the operation process.

Also, the lip part of the seal member may have a thickness that is constant or gradually decreases toward the radially inner side.

Figure 13:
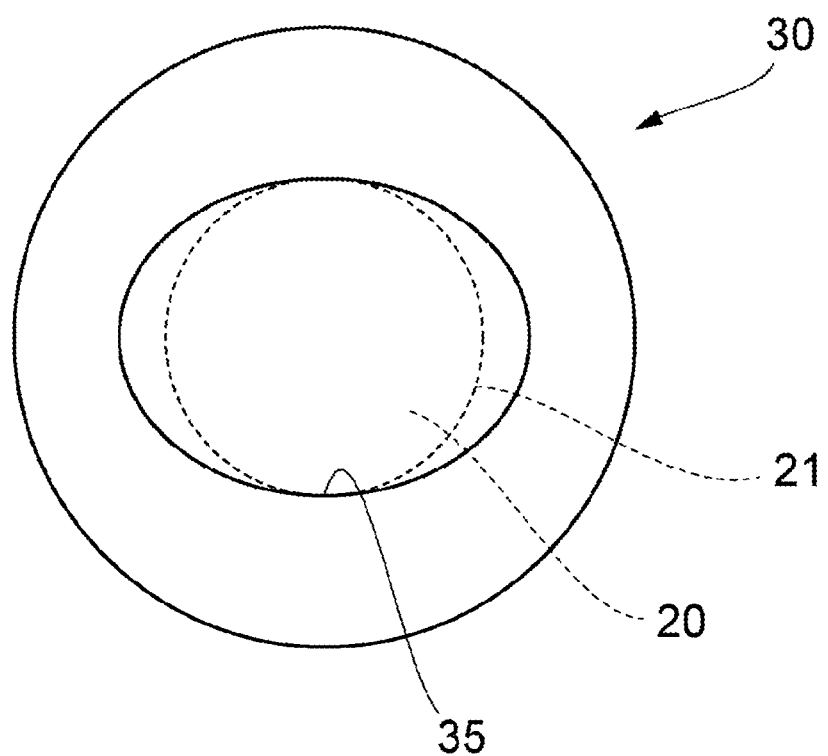
FIG. 13 is a front view of a seal member, exemplifying another embodiment.
Figure 14:
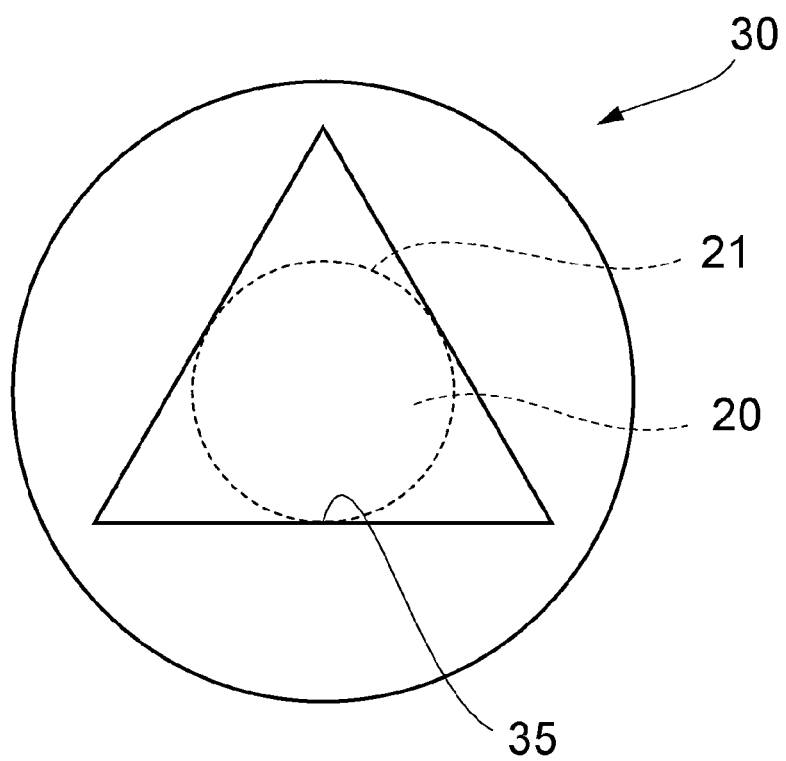
FIG. 14 is a front view of a seal member, exemplifying another embodiment.

Also, a shape of the inner diameter-side end portion of the lip part 33 of the seal member may be substantially elliptical or triangular, as shown in FIGS. 13 and 14. The other examples of the seal member 30 to be described below can also be applied to the seal members 30A, 30B, 30C, 30D, 30E, 30F.

Figure 15:
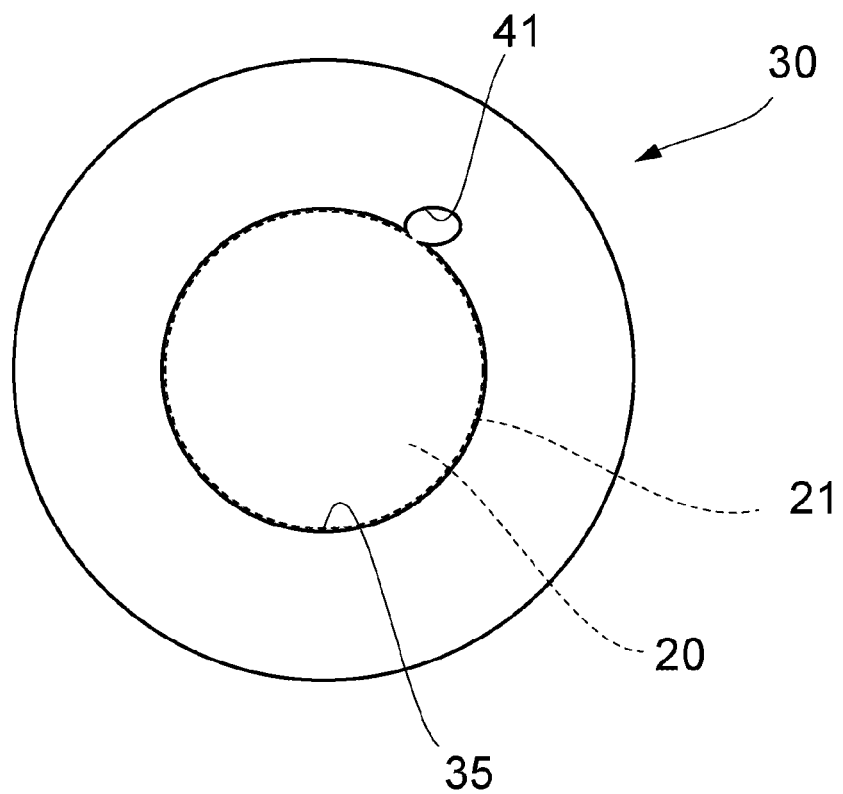
FIG. 15 is a front view of a seal member, exemplifying another embodiment.
Figure 16:
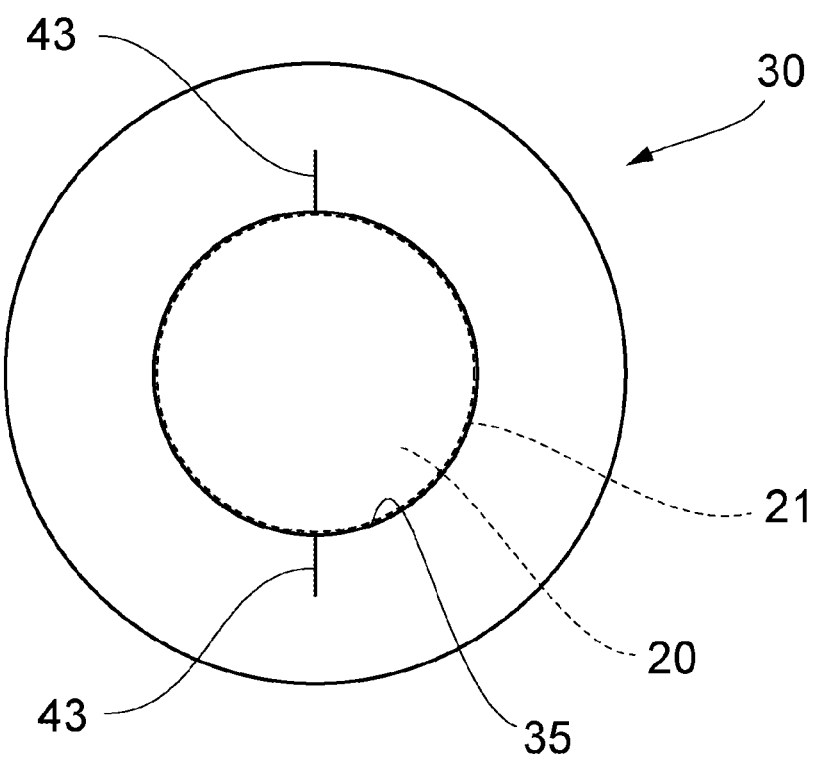
FIG. 16 is a front view of a seal member, exemplifying another embodiment.
Figure 17:
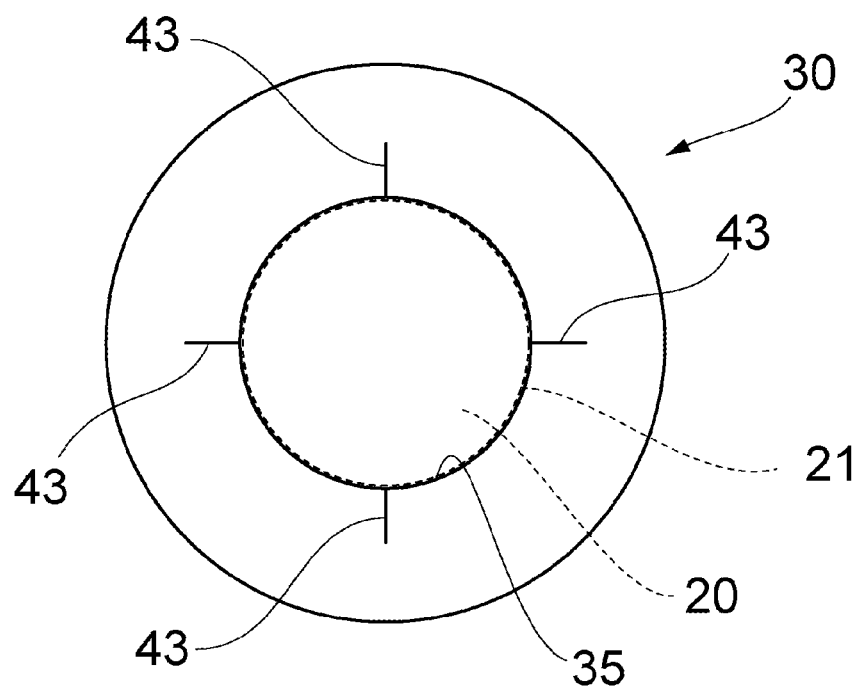
FIG. 17 is a front view of a seal member, exemplifying another embodiment.
Figure 18:
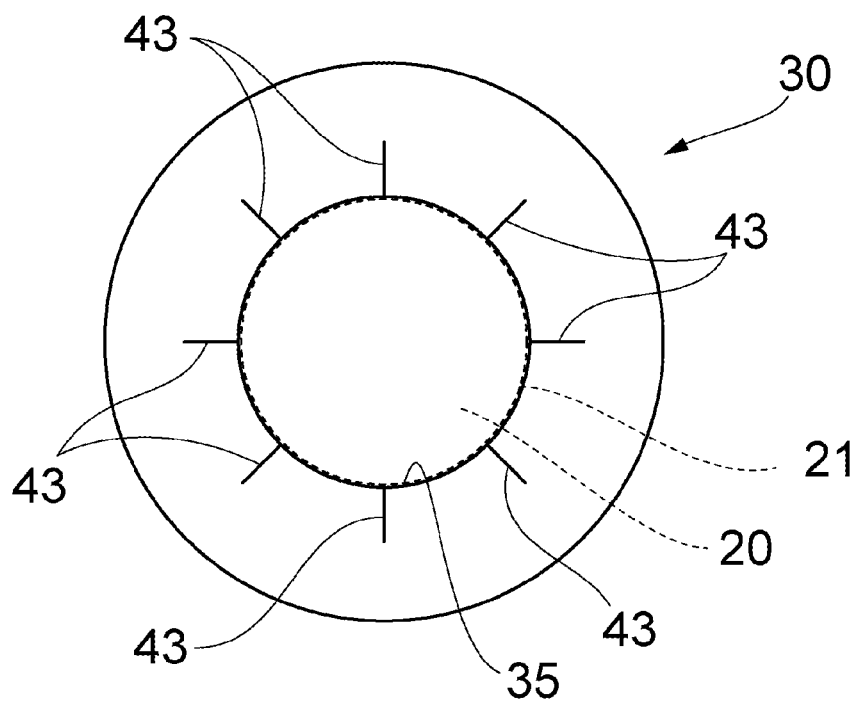
FIG. 18 is a front view of a seal member, exemplifying another embodiment.

Also, the inner diameter-side end portion of the lip part 33 may be provided with at least one ventilation hole 41, as shown in FIG. 15, or may be provided with at least one slit 43, as shown in FIGS. 16 to 18. Meanwhile, in FIG. 15, the example where one circular ventilation hole 41 is provided is shown. However, the two or more ventilation holes 41 may be provided, and the shape of the ventilation hole 41 is not limited to the circular shape. Also, FIGS. 16 to 18 show the examples where the two slits 43, the four slits 43 and the eight slits 43 are respectively provided with being equidistantly spaced in a circumferential direction. However, the numbers and circumferential intervals of the slits 43 are not limited thereto.

Figure 19:
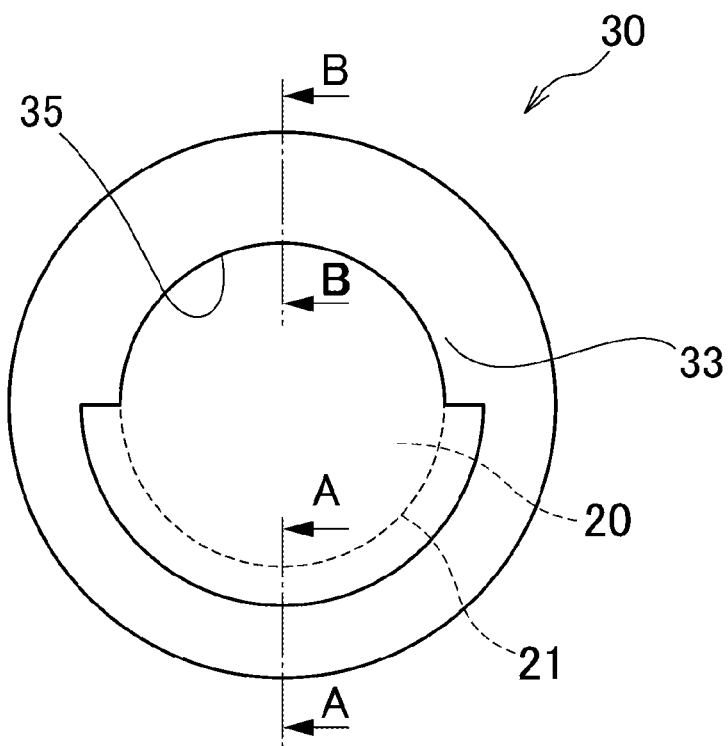
FIG. 19 is a front view of a seal member, exemplifying another embodiment.
Figure 20:
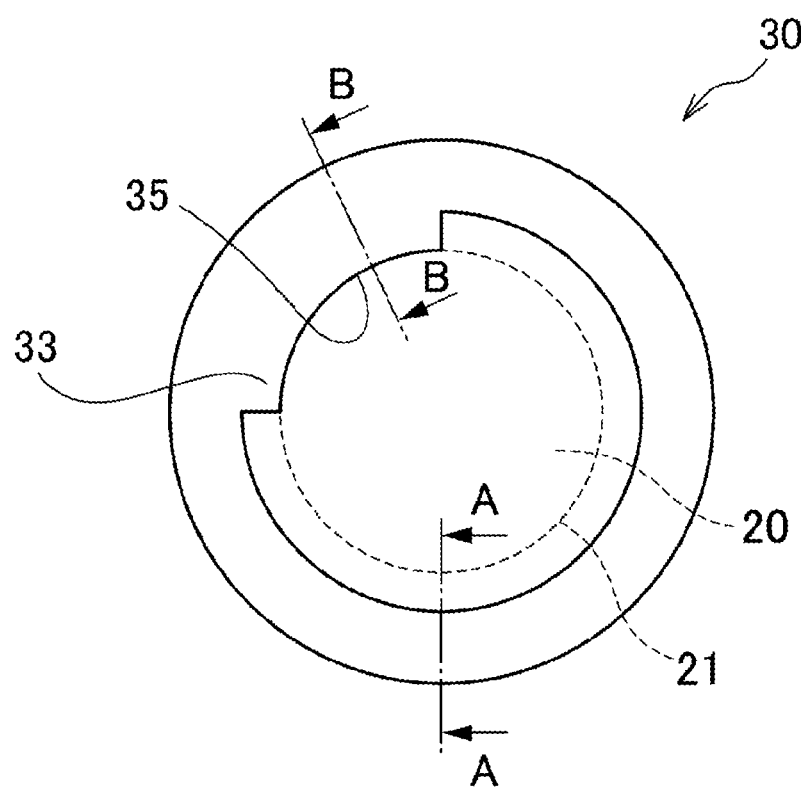
FIG. 20 is a front view of a seal member, exemplifying another embodiment.
Figure 21:
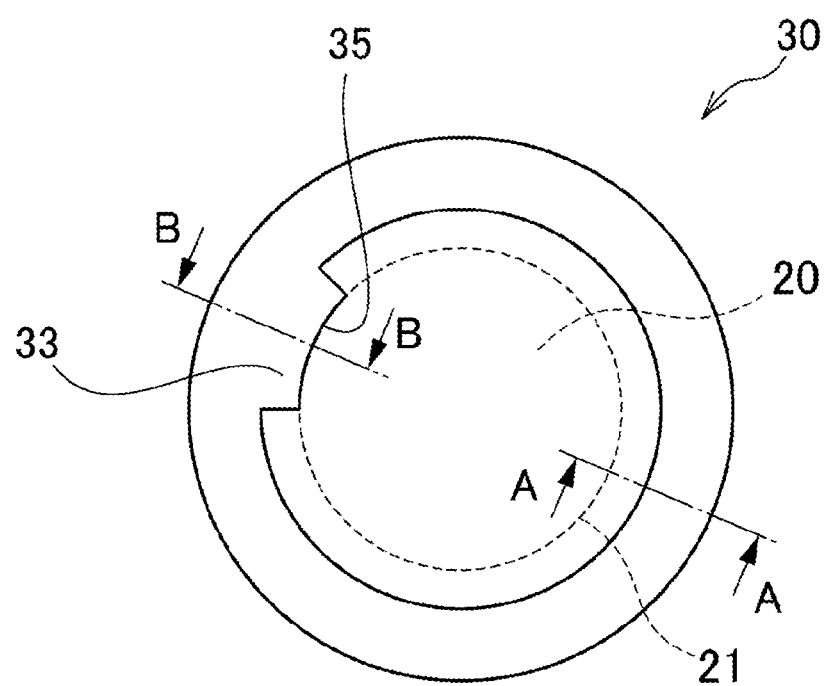
FIG. 21 is a front view of a seal member, exemplifying another embodiment.

Also, as shown in FIGS. 19 to 21, the inner diameter-side end portion of the lip part 33 may be notched continuously in the circumferential direction and the inner diameter-side end portion of the lip part 33 may be in partial contact with the outer peripheral surface 21 of the inner ring 20.

Figure 22A:
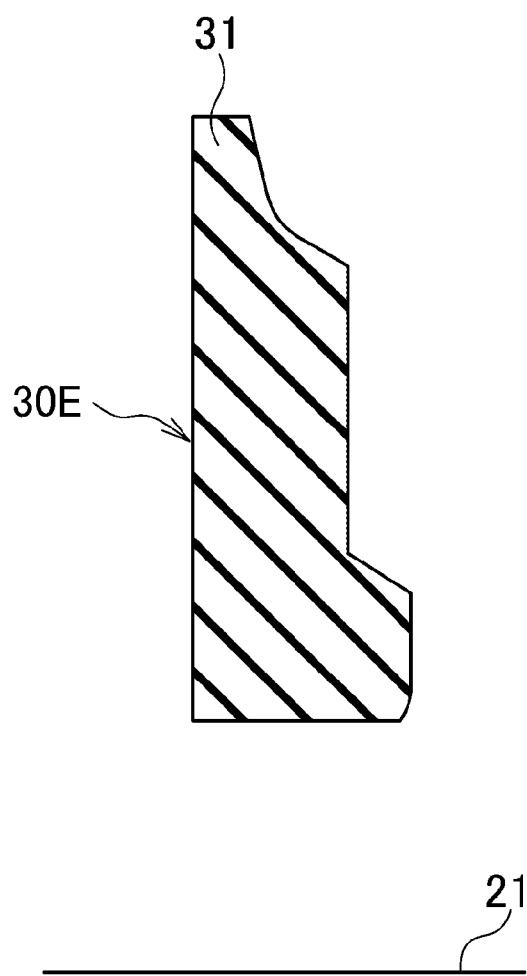
FIG. 22A is a sectional view taken along a line A-A of FIGS. 19 to 21.
Figure 22B:
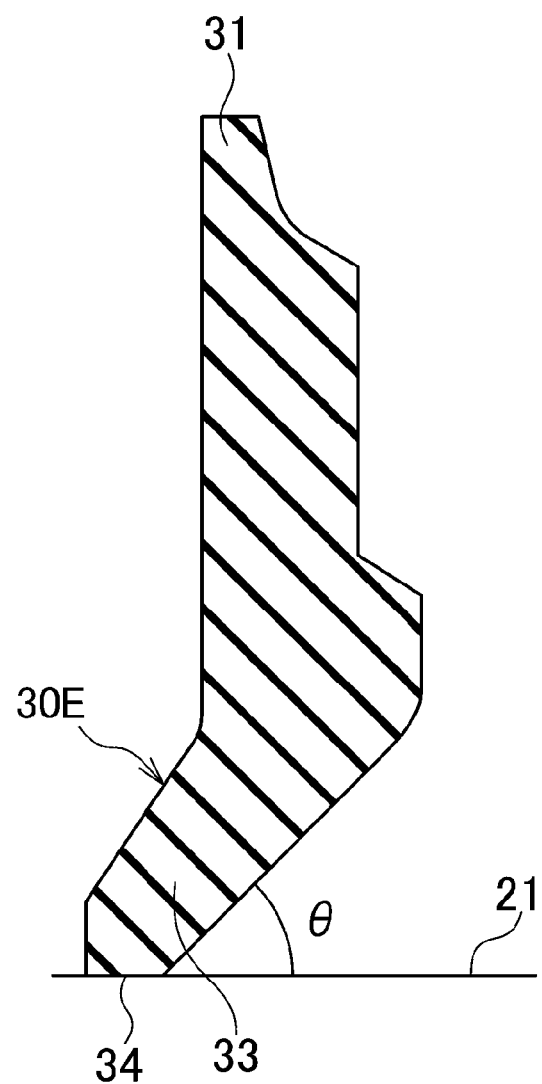
FIG. 22B is a sectional view taken along a line B-B of FIGS. 19 to 21.

Here, the seal member 30E of the sixth embodiment is exemplified. FIG. 22A is a sectional view taken along a line A-A of FIGS. 19 to 21, and FIG. 22B is a sectional view taken along a line B-B of FIGS. 19 to 21.

Like this, the present invention is not limited to the above embodiments, and combinations of the respective configurations of the embodiments and changes and applications made by one skilled in the art on the basis of the specification and the well-known technology are also included within the scope of the present invention.

For example, in the embodiments, the ball bearing is used as the rolling bearing. However, the other rolling bearing such as a roller bearing can also be used. Also, in the embodiments, the rolling bearing is an inner ring rotation type and the seal member is fixed to the outer ring. However, a configuration where the seal member is fixed to the inner ring and is in contact with the outer ring is also possible. Also, a configuration is possible in which the shape of the cage is changed to increase the bearing width, as compared to the above embodiments.

Also, the rolling bearing of the present invention may be an angular-type rolling bearing.

Figure 23:
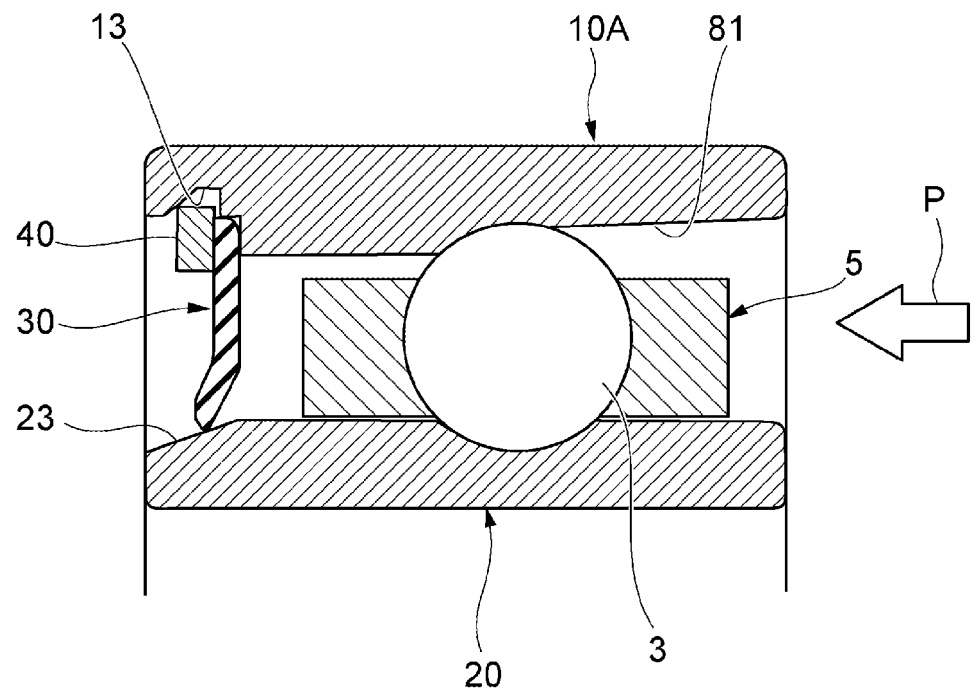
FIG. 23 is a partial sectional view of an angular-type rolling bearing having a counterbore formed in an outer ring.

FIG. 23 is a partial sectional view of an angular-type rolling bearing having a counterbore 81 formed in an outer ring 10A. The inclined surface 23 and the seal member 30 of the rolling bearing 1 of the first embodiment are applied to the outer ring 10A and the inner ring 20, for example.

Figure 24:
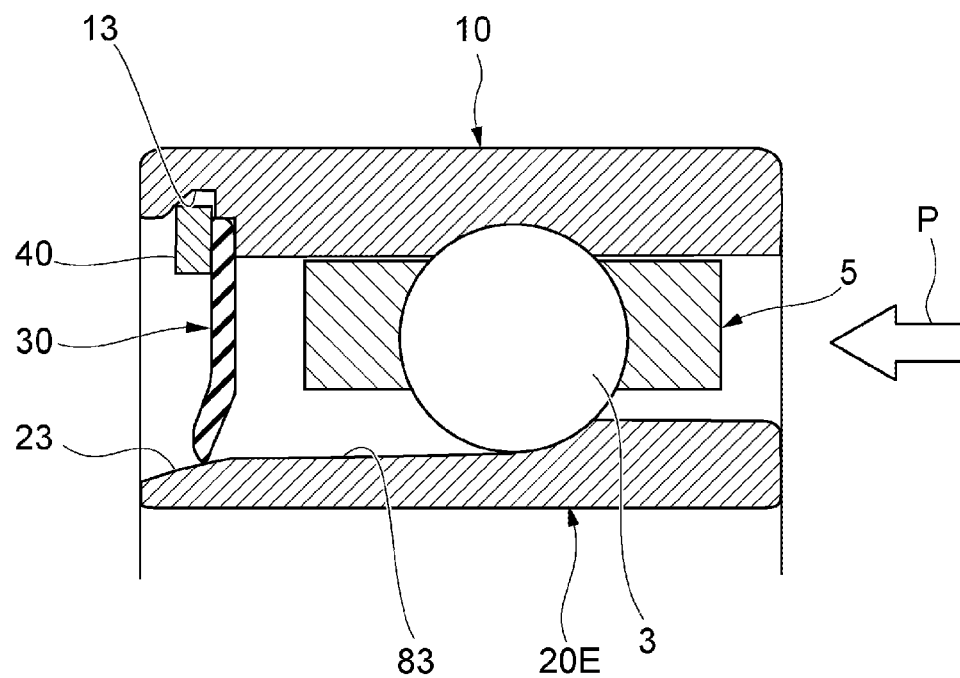
FIG. 24 is a partial sectional view of an angular-type rolling bearing having a counterbore formed in an inner ring.
Figure 25:
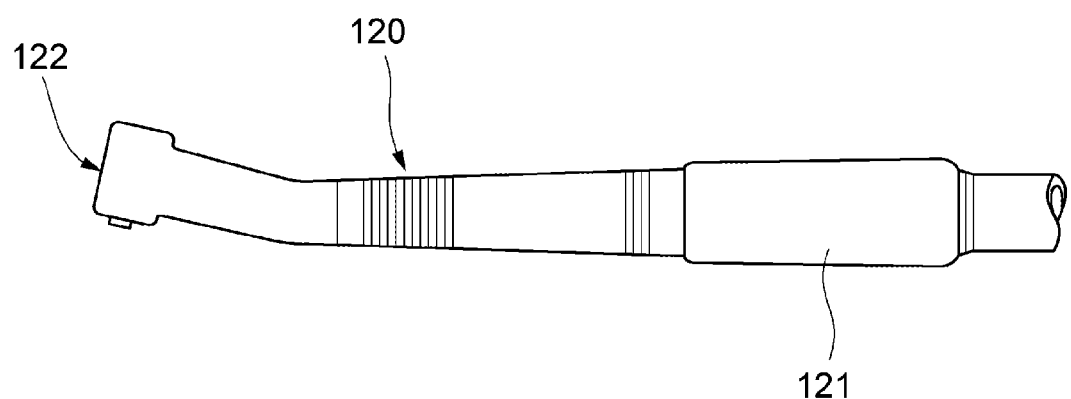
FIG. 25 is a schematic side view of an air turbine handpiece for dental use.

FIG. 24 is a partial sectional view of an angular-type rolling bearing having a counterbore 83 formed in an inner ring. Also in this case, the inclined surface 23 and the seal member 30 of the rolling bearing 1 of the first embodiment are applied to the outer ring 10 and the inner ring 20E.

As shown in FIGS. 23 and 24, even with the angular-type rolling bearing, the similar operational effects to the above-described operational effects are accomplished. Meanwhile, FIGS. 23 and 24 just show the examples, and the rolling bearings 1A to 1F of the other embodiments can be configured by the above angular-type rolling bearing or by another angular-type rolling bearing.

The subject application is based on Japanese Patent Application Nos. 2016-43309 filed on Mar. 7, 2016, 2016-100601 filed on May 19, 2016 and 2016-129149 filed on Jun. 29, 2016, the contents of which are incorporated herein by reference.

DESCRIPTION OF REFERENCE NUMERALS 1, 1B, 1C, 1D, 1E, 1F: rolling bearing
3: ball (rolling element)
5: cage
7: rim part
10, 10A: outer ring
11: inner peripheral surface
13: groove portion
15: tapered surface
17: axially inner surface
20, 20A, 20B, 20C, 20D, 20E: inner ring
21: outer peripheral surface
23: inclined surface
30, 30A, 30C, 30D, 30E, 30F: seal member
31: base part
33: lip part
35: inner peripheral surface
40: snap ring
41: ventilation hole
43: slit
67: step surface
100: bearing unit for an air turbine
200: air turbine handpiece for dental use
201: head part
S: bearing internal space

The invention claimed is:

1. A bearing unit for an air turbine comprising:
a turbine blade configured to rotate with receiving compressed air;
a rotary shaft having the turbine blade integrally fixed thereto and capable of mounting a tool thereto; and
a rolling bearing configured to rotatably support the rotary shaft to a housing,
wherein the rolling bearing comprises:
an outer ring fixed to the housing;
an inner ring fixed to the rotary shaft;
a plurality of rolling elements rollably arranged between the outer ring and the inner ring; and
a seal member fixed to an inner peripheral surface of the outer ring and configured to seal a bearing internal space between the outer ring and the inner ring,
wherein an axial end, which is positioned at a downstream side with respect to a supply direction of the compressed air, of an outer peripheral surface of the inner ring has a flat and inclined surface having a diameter that changes from large to small toward the downstream side with respect to the supply direction of axial compressed air,
wherein the seal member is configured only by an elastic material without a metal core, and has a base part extending in a radial direction and a lip part extending from a radially inner end of the base part and inclined to the downstream side with respect to the supply direction of the compressed air toward a radially inner side,
wherein when the compressed air is not applied, an inclined surface, which is positioned at an upstream side with respect to the supply direction of the compressed air, of the lip part of the seal member is in surface contact with the inclined surface of the inner ring, wherein when the compressed air is applied, a contact area between the inclined surface, which is positioned at the upstream side with respect to the supply direction of the compressed air, of the lip part of the seal member and the inclined surface of the inner ring becomes smaller, as compared to when the compressed air is not applied, wherein the lip is inclined before the seal member is fixed to the outer ring, wherein a groove portion is formed in the inner peripheral surface of the outer ring, and the groove portion has:
 a tapered surface inclined to a radially outer side toward an axially inner side; and
 an axially inner surface with which an axial side surface of the base part is in contact at a more axially inner side than the tapered surface, and wherein only the base part of the seal member and a snap ring are interposed and fixed between the tapered surface and the axially inner surface.

2. A bearing unit for an air turbine comprising:
a turbine blade configured to rotate with receiving compressed air;
a rotary shaft having the turbine blade integrally fixed thereto and capable of mounting a tool thereto; and
a rolling bearing configured to rotatably support the rotary shaft to a housing,
wherein the rolling bearing comprises:
an outer ring fixed to the housing;
an inner ring fixed to the rotary shaft;
a plurality of rolling elements rollably arranged between the outer ring and the inner ring; and
a seal member fixed to an inner peripheral surface of the outer ring and configured to seal a bearing internal space between the outer ring and the inner ring,
wherein at least a part, with which a lip part is in contact, of an outer peripheral surface of the inner ring is configured as a flat cylindrical surface along an axial direction,
wherein the seal member is configured only by an elastic material without a metal core, and has a base part extending in a radial direction and the lip part extending from a radially inner end of the base part and inclined to a downstream side with respect to a supply direction of the compressed air toward a radially inner side, wherein when the compressed air is not applied, an inner peripheral surface of the lip part of the seal member is in contact with the cylindrical surface of the inner ring, wherein when the compressed air is applied, a contact area between the inner peripheral surface of the lip part of the seal member and the cylindrical surface of the inner ring becomes smaller, as compared to when the compressed air is not applied, wherein the lip is inclined before the seal member is fixed to the outer ring, wherein a groove portion is formed in the inner peripheral surface of the outer ring, and the groove portion has:
 a tapered surface inclined to a radially outer side toward an axially inner side; and
 an axially inner surface with which an axial side surface of the base part is in contact at a more axially inner side than the tapered surface, and wherein only the base part of the seal member and a snap ring are interposed and fixed between the tapered surface and the axially inner surface.

3. The bearing unit for an air turbine according to claim 1,
wherein when the compressed air is applied, the seal member is not in contact with the outer peripheral surface of the inner ring.

4. An air turbine handpiece for dental use comprising the bearing unit for an air turbine according to claim 1.

5. The bearing unit for an air turbine according to claim 2,
wherein when the compressed air is applied, the seal member is not in contact with the outer peripheral surface of the inner ring.

6. An air turbine handpiece for dental use comprising the bearing unit for an air turbine according to claim 2.

7. An air turbine handpiece for dental use comprising the bearing unit for an air turbine according to claim 3.

8. An air turbine handpiece for dental use comprising the bearing unit for an air turbine according to claim 5.

* * * * *